N. T. Edson,
Bale Tie.
No. 68,859.   Patented Sep. 19, 1867.
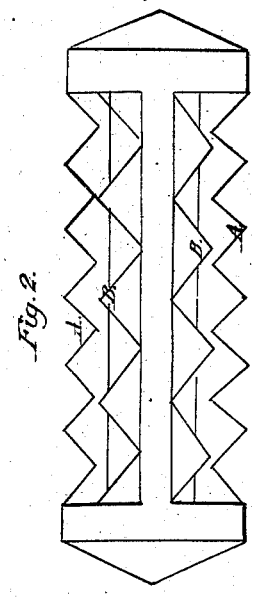
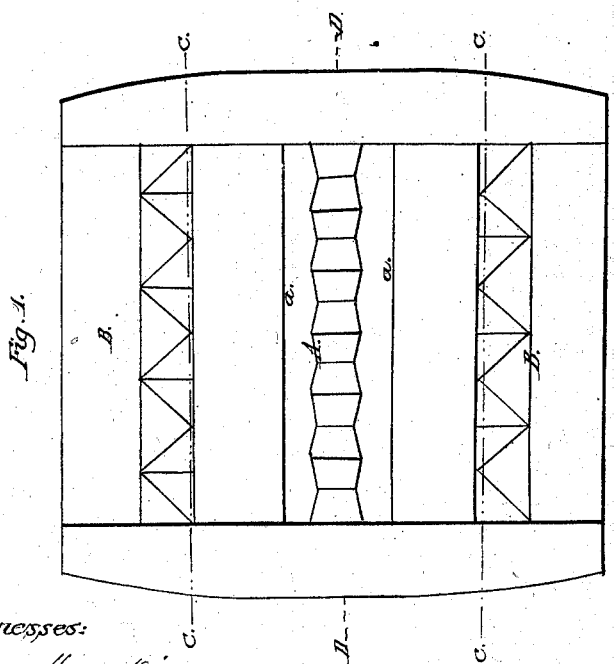
Witnesses:
William Hawkins
T. F. Manley
Inventor:
N. T. Edson

United States Patent Office.

NATHANIEL T. EDSON, OF NEW ORLEANS, LOUISIANA.

Letters Patent No. 68,859, dated September 17, 1867.

IMPROVEMENT IN COTTON-BALE TIES.

The Schedule referred to in these Letters Patent and making part of the same.

TO ALL WHOM IT MAY CONCERN:

Be it known that I, NATHANIEL T. EDSON, of New Orleans, parish of Orleans, and State of Louisiana, have invented certain new and useful Improvements in Buckles for Iron Hoops for Cotton-Bales; of which the following is a full, clear, and exact description, reference being had to the accompanying drawings, forming part of this specification, in which—

Figure I represents a plane view of a buckle embracing my improvements. In

Figure II A and B are sectional views across the lines C and D, Fig. I.

My improvements in buckles relate to that class of buckles which have no tongues. The principal objection to this class of buckles, as heretofore constructed, is that the hoop slips through them, or that their slots are so narrow that it is difficult to pass the hoop through them in their adjustment to the bale.

The object of my improvements in this class of buckles is to overcome this difficulty, and this I propose to do by forming sharp points on those parts of the buckle that come in contact with the hoop.

By referring to the accompanying drawings, it will be seen that the nature of my invention for effecting this object consists in making the central bar A with a rib, $a$, extending centrally through it, (to facilitate the moulding and for support when in use,) and providing its edge with points, and in making the outer bars B with similar projecting points, which points are intended to penetrate the comparatively soft hoop, thereby preventing it from slipping when buckling, or after. Each side of the buckle is similar.

One end of the hoop is passed through one of the slots formed by the bar A and bars B, and doubled under. The hoop is then brought around the bale or package, and its other end passed through the other similarly-formed slot and under the bar A. This having been done, and the hoop and buckle properly adjusted with the bale or package under pressure, as soon as the bale is released from pressure, the buckle, which until now stood off from it, is drawn hard against it, and the hoop coming in contact with the bale will be bent by its pressure against the bar A, and will thus be buckled.

Having thus fully described my invention, what I claim as new, and desire to secure by Letters Patent, is—

1. So constructing and providing with sharp projecting points the bar A that it will grasp and hold the hoop, substantially as and for the purposes specified.

2. I also claim so constructing and providing with sharp projecting points the bars B, substantially as and for the purposes specified.

N. T. EDSON.

Witnesses:
PAUL CHS. BOUDOUSQUIÉ.
E. PITOT.